United States Patent
Leu et al.

(10) Patent No.: US 6,376,097 B1
(45) Date of Patent: Apr. 23, 2002

(54) RECORDING MEDIA WITH A TIW SEALING LAYER

(75) Inventors: Charles Leu, Fremont; Lin Huang, San Jose; Qixu David Chen, Milpitas; Rajiv Yadav Ranjan, San Jose, all of CA (US)

(73) Assignee: Seagate Technology LLC., Scotts Valley, CA (US)

( * ) Notice: Subject to any disclaimer, the term of this patent is extended or adjusted under 35 U.S.C. 154(b) by 0 days.

(21) Appl. No.: 09/630,761

(22) Filed: Aug. 2, 2000

Related U.S. Application Data
(60) Provisional application No. 60/148,315, filed on Aug. 10, 1999.

(51) Int. Cl.[7] .................................................. G11B 5/66
(52) U.S. Cl. .................... 428/611; 428/336; 428/660; 428/665; 428/668; 428/694 TC; 204/192.15; 204/192.16; 204/192.2
(58) Field of Search .................. 428/336, 668, 428/665, 660, 694 TC, 611; 204/192.15, 192.16, 192.2

(56) References Cited

U.S. PATENT DOCUMENTS

| | | | |
|---|---|---|---|
| 5,087,482 A | 2/1992 | Kawai et al. | |
| 5,316,844 A | 5/1994 | Suzuki et al. | |
| 5,389,398 A | 2/1995 | Suzuki et al. | |
| 5,635,835 A | 6/1997 | Mouchot et al. | |
| 5,666,246 A | 9/1997 | Gill et al. | |
| 5,709,958 A | 1/1998 | Toyoda et al. | |
| 5,871,841 A | * 2/1999 | Kuratomi | 428/332 |
| 6,001,461 A | 12/1999 | Toyoda et al. | |
| 6,277,465 B1 | * 8/2001 | Watanabe et al. | 428/141 |

* cited by examiner

Primary Examiner—Stevan A. Resan
(74) Attorney, Agent, or Firm—Morrison & Foerster LLP

(57) ABSTRACT

Sputter-deposited TiW film interposed between a magnetic layer and a nitrogen-containing overcoat of a magnetic recording medium significantly reduces the migration of nitrogen from the overcoat to the magnetic layer, thereby improving the magnetic recording performances of the magnetic recording medium.

19 Claims, 4 Drawing Sheets

An Example of TiW thickness effect on Hcr and SMNR of media

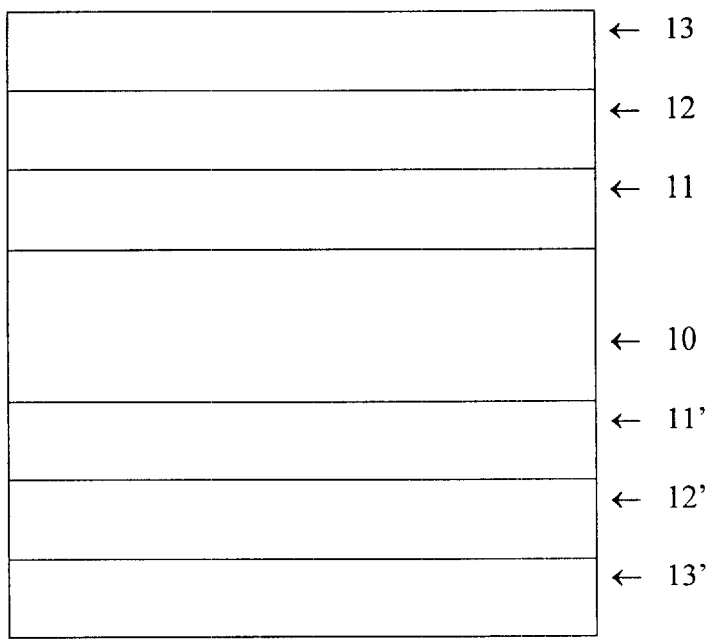
PRIOR ART
Fig. 1 schematically shows a conventional magnetic recording medium structure.

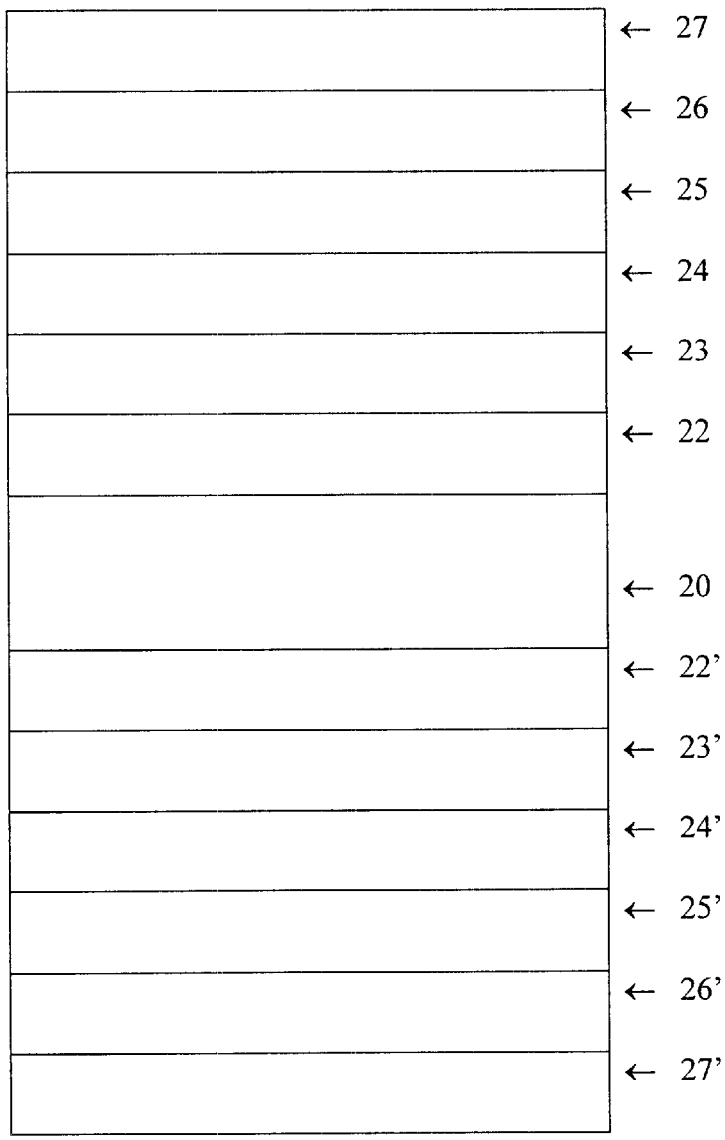
Fig. 2 schematically shows an example of a magnetic recording medium structure in accordance with an embodiment of the present invention.

| Chamber # | 1 | 2 | 3 | 4 | 5 | 6 | 7 | 8 | 9 | 10 | 11-15 | 16 | 17-19 | 20 |
|---|---|---|---|---|---|---|---|---|---|---|---|---|---|---|
| Function | Load luck | Soak Heater | Buffer chamber | Cr barrier layer | Oxidation | Buffer chamber | Buffer chamber | Seedlayer / Underlayer / Intermediate layer | Buffer chamber | Magnetic layer | Buffer chambers | Carbon overcoat | Buffer chambers | Unload luck |

Fig. 3 is an example of a process configuration of in-line sputtering machine.

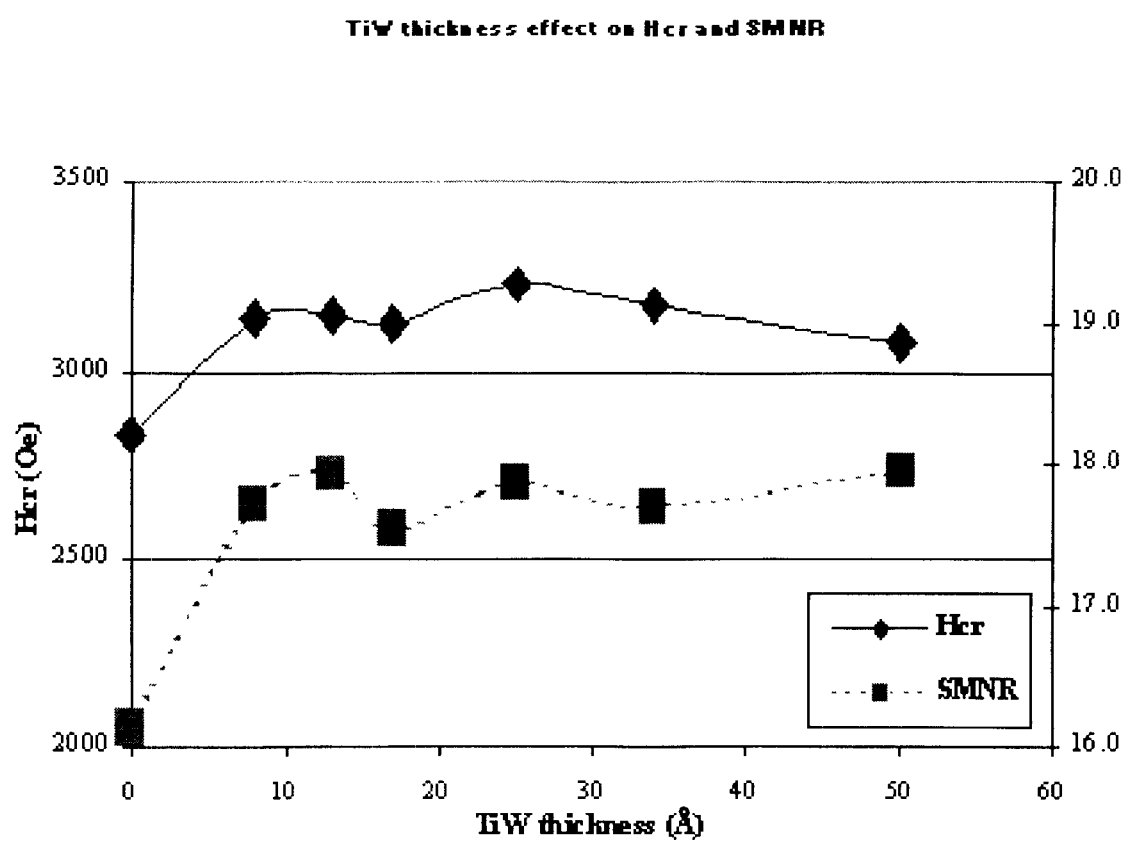
Fig. 4: An Example of TiW thickness effect on Hcr and SMNR of media

RECORDING MEDIA WITH A TIW SEALING LAYER

RELATED APPLICATIONS

This application claims priority from provisional No. 60/148,315 filed Aug. 10, 1999, entitled "Thin TiW Layer Providing Nitrogen Capping Properties," the entire disclosure of which is hereby incorporated herein by reference.

TECHNICAL FIELD

This invention relates to a magnetic medium, such as a thin film magnetic recording medium, and the method of manufacturing the medium. The invention has particular applicability to a magnetic recording medium exhibiting low noise, high coercivity and suitable for high-density longitudinal and perpendicular recording.

BACKGROUND ART

Magnetic disks and disk drives are conventionally employed for storing data in magnetizable form. Typically, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

Data are written onto and read from a rapidly rotating recording disk by means of a magnetic head transducer assembly that flies closely over the surface of the disk. It is considered desirable during reading and recording operations to maintain each transducer head as close to its associated recording surface as possible, i.e., to minimize the flying height of the head. This objective becomes particularly significant as the areal recording density increases. The areal density ($Mbits/in^2$) is the recording density per unit area and is equal to the track density (TPI) in terms of tracks per inch times the linear density (BPI) in terms of bits per inch.

A conventional longitudinal recording disk medium is depicted in FIG. 1 and typically comprises a non-magnetic substrate 10 having sequentially deposited on each side thereof an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat (not shown) to the protective overcoat. Underlayer 11, 11', magnetic layer 12, 12', and protective overcoat 13, 13', are typically deposited by sputtering techniques. A conventional overcoat layer is a carbon coating of 100–300 Å. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1, but does not comprise Cr-containing underlayers.

The increasing demands for higher areal recording density impose increasingly greater demands on flying the head lower because the output voltage of a disk drive (or the readback signal of a reader head in disk drive) is proportional to 1/exp(HMS), where HMS is the space between the head and the media However, as the space between the head the media is decreased, the probability of head-media contacts increases and a charge buildup that occurs on the surface of the top surface of the media increases. The current recording sensor designs, AMR, GMR and spin-valve pose a very serious requirement on the ESD, electrical static discharge properties. It has been found that incorporating nitrogen in carbon thin film increases its hardness and electrical conductivity. However, it has also been found that nitrogen possesses the ability to destabilize Co hexagonal-closed packed (HCP) structure and enables more face-centered cubic (FCC) structure of the Co in the magnetic layer, imposing a detrimental and unwanted effects on the magnetic layer. Therefore, there exists a need for technology preventing the charge buildup on the top surface of the media while preventing other detrimental effects on the magnetic layer.

SUMMARY OF THE INVENTION

It has been found that the charge buildup on the top surface of the media can be reduced by decreasing the total thickness of the layers interposed between the overcoat and the magnetic layer and by using an overcoat containing nitrogen instead of the conventional carbon coating. Applicants, however, found that nitrogen from the nitrogen-containing overcoat migrates to the magnetic layer. Applicants also observed that the presence of nitrogen in carbon overcoat "poisons" the Co-alloy containing magnetic layer through destabilization of the HCP structure of the Co-alloy. Therefore, applicants recognized that there is a need to find sealing layers to be interposed between the magnetic layer and nitrogen-containing overcoat, which enhance magnetic recording performances, reduce nitrogen migration, and have good adhesion to the magnetic layer and the overcoat. This invention provides a structure and a method to prevent charge buildup on the top surface of the media by using a structure comprising a combination of a nitrogen-containing overcoat and a sealing layer comprising TiW interposed between the overcoat and the magnetic layer, wherein the sealing layer substantially prevents migration of nitrogen from the overcoat to the magnetic layer.

The present invention is a magnetic recording medium comprising an overcoat containing nitrogen that does not significantly migrate to the magnetic layer and destabilize Co HCP structure. In one embodiment, the overcoat comprises a carbon-nitrogen coating.

Another advantage of the present invention is a method of manufacturing a magnetic recording medium comprising an overcoat containing nitrogen that does not significantly migrate to the magnetic layer.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a magnetic recording medium comprising longitudinal or perpendicular magnetic recording medium comprising a magnetic layer, a sealing layer comprising TiW on the magnetic layer and an overcoat comprising nitrogen on the sealing layer, wherein the sealing layer substantially prevents migration of nitrogen from the overcoat to the magnetic layer.

Another embodiment of this invention is a longitudinal or perpendicular magnetic recording medium comprising a magnetic layer, an overcoat comprising nitrogen and a sealing means for substantially preventing migration of nitrogen from the overcoat to the magnetic layer. Embodiments of the sealing means include a sputter deposited layer of a sealing material such as TiW, preferably amorphous TiW, that substantially prevents the migration of nitrogen from the nitrogen-containing overcoat to the magnetic layer.

The sealing layer or the sealing means can substantially prevent the migration of nitrogen from the nitrogen-containing overcoat by limiting nitrogen ions migrating from the overcoat to the magnetic layer to an intensity of $10^{10}$ atoms/cm$^2$ or less during the lifetime of the recording medium when the thickness of the layers between the magnetic layer and the overcoat is 1000 Å or less. In a preferred embodiment, the thickness of the layers between the magnetic layer and the overcoat is 750 Å or less. In a more preferred embodiment, the thickness of the between the magnetic layer and the overcoat is 500 Å or less.

Another aspect of the present invention is a method comprising sputter depositing a magnetic layer on a substrate, sputter depositing a sealing layer comprising TiW on the magnetic layer and sputter depositing an overcoat comprising nitrogen on the sealing layer, wherein the sealing layer substantially prevents migration of nitrogen from the overcoat to the magnetic layer. The substrates may be an Al-containing support, e.g., Al or Al—Mg, or made of glass or glass-ceramic materials.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the present invention. The drawings and description are to be regarded as illustrative in nature, and not as restrictive.

BRIEF DESCRIPTION OF DRAWINGS

FIG. 1 schematically shows a conventional magnetic recording medium structure.

FIG. 2 schematically shows an example of a magnetic recording medium structure in accordance with an embodiment of the present invention.

FIG. 3 is an example of a process configuration of in-line sputtering machine.

FIG. 4 is an example of TiW thickness effect on H$_{cr}$ and SMNR.

DESCRIPTION OF THE INVENTION

The present invention enables the manufacture of magnetic recording media exhibiting low nitrogen migration from a nitrogen-containing overcoat to the magnetic layer and suitable for high density longitudinal and perpendicular magnetic recording employing overcoats comprising high nitrogen concentrations, e.g., about 1 to about 30 at. %, preferably about 2 to about 28 at. %, most preferably about 5 to 25 at. %. As a result, the utility of such a recording medium using a very small gap, e.g., about 1 micron to 0.3 micron, between the head and medium is expanded to extreme environments, including static discharge prone environments. This objective is achieved in accordance with embodiments of the present invention by strategically forming a sealing layer or a sealing means on the magnetic layer. The sealing layer or the sealing means substantially prevents the migration of nitrogen from the nitrogen-containing overcoat to the magnetic layer.

The sealing layer can function as a seed layer when additional layers are formed between the sealing layer and the overcoat. For example, a silicon oxide layer or a silicon oxide layer containing silica particles could be formed on the sealing layer as an intermediate layer between the sealing layer and the overcoat. A sealing layer is a layer that can reduce nitrogen concentration on the surface of the magnetic layer to less than $10^{10}$ atoms/cm$^2$ by the time-of-flight secondary ion mass spectrometry (TOF-SIMS) method as follows. In particular, the quantification of the nitrogen concentration is done by a combined calibration method utilizing nuclear reaction analysis and TOF-SIMS by exposing the sample to alpha particles and by knowing the nitrogen collision cross-section area, one can determine the actual nitrogen atom contents in terms of concentration, with which one can calibrate the TOF-SIMS' observation and obtain a quantification of nitrogen concentration.

The exact mechanism underpinning sealing of nitrogen to the overcoat employing a TiW layer, preferably amorphous TiW, is not known with certainty. It is believed that nitrogen migration is substantially prevented by denying nitrogen ions access to grain boundaries, which are high diffusion paths. An amorphous layer and/or a single-crystal type layer are substantially devoid of grain boundaries and, hence, could provide effective sealing of nitrogen from the overcoat. While an amorphous TiW layer is the preferred embodiment of the sealing layer and the sealing means, any metal or metal oxide layer that could substantially prevent the migration of nitrogen from the overcoat could be employed in this invention.

Embodiments of the substrate comprising Ni includes Al, Al—Mg, glass or glass-ceramic support with a pre-coat of NiP, NiNb or other Ni-containing material. Optionally, the sealing layer can contain one or more elements or the oxides of elements such as Mo, Ta, Zr and Nb. The preferred ranges of Ti, Mo, Cr, Nb, W, Ta, Zr and Nb, etc. are as follows: 12 to 72 at. %, preferably, 37 to 62 at. %, more preferably, 51 to 62 at. %.

The sealing layer or layers can advantageously be deposited at a total thickness of about 5 Å to about 100 Å, such as about 6 Å to about 50 Å, preferably about 10 Å to about 35 Å. The sealing layer can be a sputter deposited layer of Ti and W.

Embodiments of the present invention also comprise e forming an adhesion enhancement layer, such as Cr or Cr alloy, between the sealing layer and magnetic layer for improved adhesion of the sealing layer to the underlying magnetic layer without reducing the sealing effect of the sealing layer. An adhesion enhancement layer is a sputter-deposited thin film layer in the thickness range of 15 Å to 200 Å that provides a better adhesion between a layer below the adhesion enhancement layer a layer above the adhesion layer than without the presence of the adhesion enhancement layer. In a preferred embodiment, the adhesion enhancement layer is a sputter-deposited thin film layer in the thickness range of 25 Å to 75 Å.

Embodiments of the present invention also comprise a substrate below the magnetic layer and a layer between the substrate and the magnetic layer. The layer between the substrate and the magnetic layer could be a seed layer and/or an underlayer, such as a Cr or Cr alloy, e.g., chromium vanadium (CrV) or an alloy of Co, Cr, platinum and tantalum (CoCrPtTa). Also as in conventional practices, a lubricant topcoat can be applied on the nitrogen-containing overcoat.

Advantageously, the present invention enables the manufacture of magnetic recording media having a nitrogen-containing overcoat and enables the use of such magnetic recording medium for very high-density recording using very small gap between the head and the medium.

This objective is achieved in accordance with various embodiments of the present invention. An embodiment of the present invention is schematically illustrated in FIG. 2 and comprises a substrate 20 having a pre-coat of a Ni-containing material. Sequentially deposited on each side of substrate 20 are underlayer 22, 22', intermediate layer 23, 23', magnetic layer 24, 24', TiW sealing layer 25, 25', nitrogen-containing overcoat 26, 26' and lubricant 27, 27'.

In addition, optionally, seed layers could be located between the substrate 20 and underlayer 22, 22'. Seed layer, at a thickness of about 20 to 800 Å, preferably about 25 to 200 Å, most preferably about 130 Å, can comprise Cr or Cr alloy. Underlayer 22, at a thickness of about 10 to 500 Å, preferably about 15 to 200 Å, most preferably about 20 Å, can comprise Cr or an alloy thereof, such as CrV. Suitable intermediate layer 23 includes CrW, CoCr or Cr alloy at a thickness of 10 to 500 Å, preferably about 50 to 200 Å, most preferably about 100 Å. Suitable magnetic layer 24 includes a Co-containing layer, such as a CoCrPtTa alloy at a thickness of about 25 to 500 Å, preferably about 50 to 250 Å, most preferably about 150 Å. Suitable materials for nitrogen-containing overcoat 26, at a thickness of about 25 to 125 Å, preferably about 30 to 75 Å, most preferably about 60 Å include a nitrogen-containing hydrogenated carbonated film. A Cr or Cr alloy adhesion enhancement layer can optionally be deposited between magnetic layer and the TiW layer at a thickness of about 100 to 1000 Å, preferably about 200 to 600 Å, most preferably about 150 Å.

Advantageously, the present invention can be conducted by sputter depositing layers shown in the embodiment of FIG. 3 in an in-line pass-by apparatus comprising a plurality of sequentially spaced sputtering chambers.

EXAMPLES

1) Film configuration

The film configuration of an embodiment of the present invention is shown in FIG. 2. On the substrate (which can be NiP coated Al, NiP coated glass, or alternative substrates), a Cr layer is deposited by DC magnetron sputtering. Following the underlayer formation process, an intermediate layer, a magnetic layer and thin TiW layer are deposited by DC magnetron sputtering. Then AC or RF sputtering is used for depositing a nitrogen-containing carbon overcoat. This invention applies to any manufacturing process for longitudinal recording media.

2) Sputtering machine and process.

A schematic drawing of the in-line sputtering machine used to deposit the invented disks is shown in FIG. 3. All chambers have a vacuum at about $10^7$ Torr.

A pallet, which carries multiple disks, enters the load chamber 1. Then it is heated in chamber 2. The disks are heated again in chamber 6. A seed layer, an underlayer and an intermediate layer are deposited in chamber 8. Then a magnetic layer and a thin TiW layer are deposited in chamber 10. A nitrogen-containing carbon overcoat is finally deposited on the magnetic layer in chamber 16.

3) Evidence that TiW layer reduces the adverse effects of nitrogen migration from nitrogen-containing carbon overcoat Nitrogen migration from the nitrogen-containing overcoat to the magnetic layer results in "poisoning" of the magnetic layer, which in turn affect the remanent coercivity ($H_{cr}$) and signal to medium noise ratio (SNMR). FIG. 4 is an example of a medium having the structure of Cr/CrW/CoCr/$Co_{71}Cr_{17}Pt_8Ta_2Nb_2$/$Ti_{10}$W/C:H:N demonstrating TiW thickness effects on $H_{cr}$ and SMNR.

$H_{cr}$ was measured with Rotating Disc Magnetometer (RDM). SMNR was measured with a read-write analyzer from Guzik Technical Enterprise, San Jose, Calif. A giant magnetoresistive (GMR) head was used for the test. SMNR was measured at 360 kfci (thousand flux reversal per inch). FIG. 4 shows that even with a 10 Å thick TiW sealing layer, there is a dramatic improvement in $H_{cr}$ and SMNR.

FIG. 4 conveys clearly to those skilled in the art that the applicants invented the complete ranges disclosed in these figures. Applicants might seek to protect by their claims any part of the invention described in the specification.

In summary, sputter-deposited thin TiW film have good adhesion to magnetic layer, and significantly reduce nitrogen migration from the nitrogen-containing overcoat to the magnetic layer. The TiW film is a sealing layer or a sealing means and is capable of limiting nitrogen ions migrating from the nitrogen-containing overcoat to the magnetic layer to an intensity of $10^{10}$ atoms/cm$^2$ or less during the lifetime of the recording medium when the thickness of the layers the magnetic layer and the nitrogen-containing overcoat is 1000 Å or less.

What is claimed is:

1. A longitudinal or perpendicular magnetic recording medium comprising:
   a magnetic layer;
   a TiW sealing layer of $\leq 50$ Å thickness substantially devoid of grain boundaries on the magnetic layer; and
   an overcoat comprising nitrogen on the sealing layer,
      wherein the sealing layer substantially prevents migration of nitrogen from the overcoat to the magnetic layer.

2. The magnetic recording medium according to claim 1, wherein the magnetic layer comprises Co or Co-alloy.

3. The magnetic recording medium according to claim 1, wherein the overcoat further comprises carbon.

4. The magnetic recording medium according to claim 2, wherein the magnetic layer further comprises B.

5. The magnetic recording medium according to claim 1, further comprising:
   a substrate below the magnetic layer; and
   a layer between the substrate and the magnetic layer.

6. The magnetic recording medium according to claim 5, wherein the layer comprises Cr or Cr-alloy.

7. The magnetic recording medium according to claim 1, wherein the thickness of the sealing layer is about 1 Å to about 500 Å.

8. The magnetic recording medium according to claim 5, wherein the substrate is selected from the group consisting of NiP coated Al and Ni coated glass.

9. The magnetic recording medium to claim 1, wherein the overcoat further comprises carbon and the sealing layer is capable of limiting nitrogen ions migrating from the overcoat to the magnetic layer to an intensity of $10^{10}$ atoms/cm$^2$ or less during the lifetime of the magnetic recording medium when a total thickness of layers between the magnetic layer and the overcoat is 1000 Å or less.

10. The magnetic recording medium according to claim 1, wherein the magnetic layer comprises an alloy of Co, Cr and B.

11. A method of manufacturing a longitudinal or perpendicular magnetic recording medium, the method comprising:
   sputter depositing a magnetic layer on a substrate;

sputter depositing a TiW sealing layer of ≦50 Å thickness substantially devoid of grain boundaries on the magnetic layer; and sputter depositing an overcoat comprising nitrogen on the sealing layer, wherein the sealing layer substantially prevents migration of nitrogen from the overcoat to the magnetic layer.

12. The method according to claim 11, wherein the magnetic layer comprises Co or Co-alloy.

13. The method according to claim 11, wherein the overcoat further comprises carbon.

14. The method according to claim 12, wherein the magnetic layer further comprises B.

15. The method according to claim 11, further comprising sputter depositing a layer between the substrate and the magnetic layer.

16. The method according to claim 15, wherein the layer comprises Cr or Cr-alloy.

17. The method according to claim 11, wherein the thickness of the sealing.

18. The method according to claim 11, wherein the substrate is selected from the group consisting of NiP coated Al and Ni coated glass.

19. The method according to claim 11, wherein the overcoat further comprises carbon and the sealing layer is capable of limiting nitrogen ions migrating from the overcoat to the magnetic layer to an intensity of $10^{10}$ atoms/cm$^2$ or less during the lifetime of the magnetic recording medium when a total thickness of layers between the magnetic layer and the overcoat is 1000 Å or less.

* * * * *